US008140178B2

(12) United States Patent
Hon et al.

(10) Patent No.: US 8,140,178 B2
(45) Date of Patent: Mar. 20, 2012

(54) MACHINE TOOL SYSTEM FOR MEASURING SHAPE OF OBJECT TO BE MEASURED BY USING ON-BOARD MEASURING DEVICE

(75) Inventors: Yonpyo Hon, Yamanashi (JP); Kenzo Ebihara, Yamanashi (JP); Akira Yamamoto, Yamanashi (JP); Masayuki Hamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 308 days.

(21) Appl. No.: 12/478,070

(22) Filed: Jun. 4, 2009

(65) Prior Publication Data
US 2010/0030368 A1 Feb. 4, 2010

(30) Foreign Application Priority Data
Jul. 29, 2008 (JP) ................................ 2008-195048

(51) Int. Cl.
*G06F 19/00* (2011.01)
(52) U.S. Cl. ........ 700/195; 700/114; 700/192; 700/186; 700/175; 700/169; 33/559; 33/556; 33/549; 33/544.4; 310/90.5; 901/41; 901/44
(58) Field of Classification Search .................. 700/195, 700/160, 186, 193, 250, 260; 33/503–504, 33/544.4, 556; 901/41, 44
See application file for complete search history.

(56) References Cited

U.S. PATENT DOCUMENTS

| 4,562,392 | A | * | 12/1985 | Davis et al. ................... 318/572 |
|---|---|---|---|---|
| 4,620,281 | A | * | 10/1986 | Thompson et al. ........... 700/176 |
| 4,636,960 | A | * | 1/1987 | McMurtry ..................... 700/193 |
| 5,419,222 | A | * | 5/1995 | Bieg ............................... 82/1.11 |
| 6,150,786 | A | * | 11/2000 | Kinoshita et al. ............. 318/564 |
| 6,539,642 | B1 | * | 4/2003 | Moriyasu et al. ................ 33/551 |
| 6,601,311 | B2 | * | 8/2003 | McMurtry et al. .............. 33/502 |
| 6,912,446 | B2 | * | 6/2005 | Wang et al. .................... 700/193 |
| 7,283,889 | B2 | * | 10/2007 | Otsuki et al. ................... 700/186 |
| 7,852,031 | B2 | * | 12/2010 | Hon et al. ....................... 318/572 |
| 7,860,601 | B2 | * | 12/2010 | Piggott et al. ................. 700/175 |
| 2007/0005178 | A1 | * | 1/2007 | Prestidge et al. ............. 700/186 |

(Continued)

FOREIGN PATENT DOCUMENTS

JP 63-212448 A 9/1988

(Continued)

OTHER PUBLICATIONS

JP 2003039282, "Machine translation document", Jun. 2, 2011, pp. 1-25.*

(Continued)

*Primary Examiner* — Albert Decady
*Assistant Examiner* — Olvin Lopez Alvarez
(74) *Attorney, Agent, or Firm* — Lowe Hauptman Ham & Berner, LLP

(57) ABSTRACT

In a simultaneous multi-axis measuring machine tool system including linear drive axes and rotation axes to measure a surface shape of an object to be measured by using an on-board measuring device having a probe mounted, at one end thereof, with a spherical contactor, a numerical controller controls driving of the linear drive axes and the rotation axes so that a central axis of the probe is always oriented in a direction perpendicular to the surface of the object to be measured and that the spherical contactor of the probe comes in contact with and follows a surface of the object to be measured.

1 Claim, 14 Drawing Sheets

U.S. PATENT DOCUMENTS

| | | | |
|---|---|---|---|
| 2008/0051927 A1* | 2/2008 | Prestidge et al. | 700/195 |
| 2008/0101881 A1* | 5/2008 | Hon et al. | 409/214 |
| 2008/0184579 A1* | 8/2008 | McFarland | 33/551 |
| 2008/0249741 A1* | 10/2008 | Hon et al. | 702/168 |
| 2009/0033271 A1* | 2/2009 | Hon et al. | 318/640 |
| 2009/0112357 A1* | 4/2009 | Hammond et al. | 700/194 |
| 2009/0183610 A1* | 7/2009 | Maxted et al. | 82/1.11 |
| 2009/0292503 A1* | 11/2009 | Hon et al. | 702/168 |
| 2010/0018069 A1* | 1/2010 | Ould et al. | 33/503 |

FOREIGN PATENT DOCUMENTS

| | | |
|---|---|---|
| JP | 06-186023 | 7/1994 |
| JP | 2003039282 A | 2/2003 |
| JP | 2007-118100 | 5/2007 |
| JP | 2007-276049 | 10/2007 |

OTHER PUBLICATIONS

Notice of Reasons for Rejection for Japanese Patent Application No. 2008-195048, mailed May 11, 2010.

Notice of Reasons for Refusal for Japanese Patent Application No. 2008-195048, mailed Aug. 17, 2010.

* cited by examiner

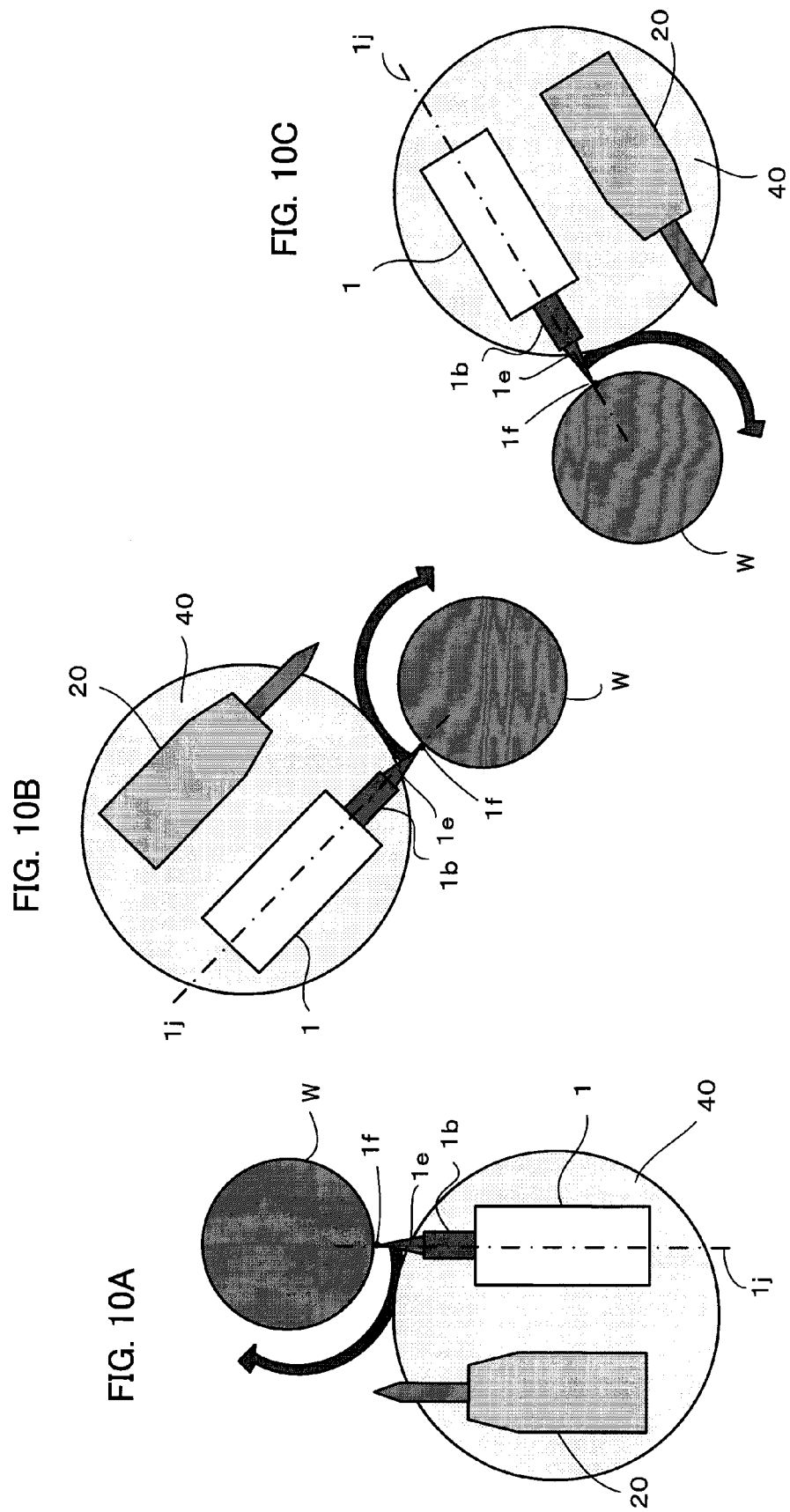

MACHINE TOOL SYSTEM FOR MEASURING SHAPE OF OBJECT TO BE MEASURED BY USING ON-BOARD MEASURING DEVICE

RELATED APPLICATIONS

The present application is based on, and claims priority from, Japanese Application Number 2008-195048, filed Jul. 29, 2008, the disclosure of which is hereby incorporated by reference herein in its entirety.

BACKGROUND OF THE INVENTION

1. Field of the Invention

The present invention relates to a machine tool system for measuring a shape of an object to be measured and having a three-dimensional free shape by using an on-board measuring device.

2. Description of the Related Art

As a measuring device for measuring a surface shape of a machined workpiece with high accuracy, there is a prior-art known measuring device having a touch probe. The shape of the surface of the workpiece is measured by attaching the measuring device to a machine tool, bringing a contactor of the touch probe into contact with the surface of the workpiece, and moving linear drive axes of the machine tool.

For example, there is an on-board measuring device used for machining of a rotation axis symmetric curved surface as disclosed in Japanese Patent Application Laid-Open No. 2007-118100, in which the on-board measuring device and a machining tool are disposed on a linear drive axis, an X axis, a Z axis, and a C axis are driven, and the on-board measuring device scans on the X-axis to thereby measure a shape of a surface of an object having the rotation axis symmetric curved surface.

There is a touch probe device for three-dimensional measurement as disclosed in Japanese Patent Application Laid-Open No. 6-186023 in which an attitude of a touch probe is controlled based on a measuring command so that the touch probe is brought into contact with a workpiece in an optimum direction. In the touch probe device, a probe main body is provided with a turning and oblique oscillation mechanism for changing a turning angle and an obliquity angle of the touch probe so as to always orient the touch probe in the direction of the normal to a surface of a workpiece in measurement.

Because the on-board measuring device disclosed in the above-mentioned Japanese Patent Application Laid-Open No. 2007-118100 moves linearly, it is difficult to measure the shape of the surface of a workpiece having a small radius of curvature. In the touch probe device disclosed in the above-mentioned Japanese Patent Application Laid-Open No. 6-186023, the touch probe carries out position measurement at many points of the surface of the workpiece (from one point to another in a discontinuous manner) to thereby perform shape measurement but does not continuously scan the surface while staying in contact with the surface of the workpiece. The touch probe can measure a surface shape of an object in a measurement range of −90° to +90° but cannot measure a shape of a sphere because of its structure.

If the shape is measured in the same direction irrespective of an inclination of the surface of the object to be measured in the measuring device using the touch probe, an area of the measuring head that comes in contact with the surface of the object to be measured in measurement increases when the shape of the object to be measured is more complicated. This will be described by using FIGS. 14 and 15.

FIG. 14 shows measurement of a surface of a workpiece W having a curved surface with a measuring device (not shown) mounted on a machine by only a plurality of linear drive axes without using a rotation axis. For this on-board measurement, a spherical measuring head If (ruby sphere) is brought into contact with the surface (curved surface) of the workpiece W and the on-board measuring device is caused to scan by only the linear drive axis to detect displacement of a probe 1b in the axial direction of the probe 1b. If the probe 1b having the spherical measuring head 1f (ruby sphere) moves in a measuring direction, the spherical measuring head 1f moves to follow the surface of the workpiece W while staying in contact with the surface of the workpiece W as shown at points (1) to (5) in FIG. 14.

FIGS. 15A to 15E explain the way in which the surface of the workpiece W and the spherical measuring head 1f (ruby sphere) are in contact with each other in measurement at the points (1) to (5) in FIG. 14. A position (touch point TP) on the surface of the spherical measuring head If which is in contact with the surface of the workpiece W moves as shown in FIGS. 15A, 15B, 15C, 15D, and 15E. An area in which the spherical measuring head 1f is in contact with the surface of the workpiece W while the measuring device moves from the point (1) to the point (5) in FIG. 14 in this manner (i.e., a movement distance of the touch point TP on the spherical measuring head 1f) is shown as a solid line segment in FIG. 15F. On the other hand, an area in which the spherical measuring head 1f does not come in contact with the surface of the workpiece W while the measuring device moves from the point (1) to the point (5) in FIG. 14 is shown as a dotted line segment in FIG. 15F. The more complicated a shape of the surface of the workpiece W that is the object to be measured and the greater an angle (contact angle) between a central axis of the probe 1b and the a direction of the normal to the surface of the workpiece W (a line connecting the touch point TP and a center of the spherical measuring head 1f), the larger the area (a length of the solid line segment in FIG. 15F) in which the spherical measuring head 1f is in contact with the surface of the workpiece W becomes.

Normally, the measuring head used in the contact type on-board measuring device is in a spherical shape like the ruby sphere. In order to correct a shape error of the spherical measuring head, calibration is carried out by using a calibration primary standard such as a reference sphere. However, an area of the spherical measuring head that can come in contact with the surface of the reference sphere is determined by a radius of curvature of the calibration primary standard (reference sphere) and a measurable contact angle. A shape error of the surface of the spherical measuring head that is not measured in measurement of the calibration primary standard cannot be calibrated. Therefore, in actual measurement of a shape of an object to be measured having a different shape from the calibration primary standard or a large contact angle, a part of the surface of the spherical measuring head that is not calibrated comes in contact with the surface of the object to be measured. As a result, the shape error of the spherical measuring head cannot be corrected in many cases, which reduces measurement accuracy.

The farther the surface part (touch point TP) of the spherical measuring head 1f which is in contact with a curved surface of the object to be measured in measurement of the curved surface from a point (CT) of intersection of the central axis of a probe (movable member) of the on-board measuring device and the surface of the spherical measuring head 1f, the greater stress acts on the probe of the on-board measuring device, which reduces the measurement accuracy. This will be described by using FIGS. 12 and 13.

FIG. 12 is a schematic sectional view of a general on-board measuring device. As shown in FIG. 12, there is a minute clearance (bearing clearance 1h) between a probe 1b and a bearing 1g. Here, if the on-board measuring device is moved by a linear drive axis in a measuring direction, a force perpendicular to a central axis 1j of the probe 1b acts on the spherical measuring head 1f. As a result, a rod 1e of the measuring head bends as shown in FIG. 13.

Because there is the bearing clearance 1h between the probe 1b and the bearing 1g along a longitudinal direction of the probe 1b, the probe 1b tilts inside the bearing 1g as shown in FIG. 13. Moreover, shear stress may act on a junction of the rod 1e of the measuring head and the spherical measuring head 1f or on a junction of the rod 1e of the measuring head and the probe 1b to thereby damage the junction.

In ultraprecision machining, corrective machining by means of on-board measurement is essential for achievement of nanoscale shape measurement. Recently, machining shapes that require the corrective machining by means of the on-board measurement are getting more complicated. Even for a shape having a steep inclination angle over 60°, it is necessary to achieve nanoscale high shape accuracy. Moreover, as demand for simultaneous five-axis machining grows, requirement for on-board measurement of a three-dimensional shape by means of five-axis machining grows as well.

SUMMARY OF THE INVENTION

Therefore, it is an object of the present invention to provide a machine tool system for measuring a shape of an object to be measured by means of on-board measurement which is carried out by simultaneous multi-axis measurement including a linear drive axis and a rotation axis and by bringing the same tip end point of a measuring head of the on-board measuring device in contact with a surface of the object to be measured.

According to the present invention, there is provided a machine tool system including: a machine tool having one or more linear axes and one or more rotation axes; an on-board measuring device mounted on the machine tool and including a probe having a measuring head; a numerical controller for controlling driving of the respective axes of the machine tool; a position detecting device for detecting positions of the respective axes of the machine tool; and a measuring arithmetic device for measuring and calculating a shape of an object to be measured based on position detection signals of the respective axes of the machine tool detected by the position detecting device and a measurement signal detected by the on-board measuring device. The numerical controller controls driving of the respective axes of the machine tool so that the measuring head of the probe comes in contact with and follows a surface of the object to be measured according to a measurement program designed to orient a central axis of the probe in a direction perpendicular to a surface of the object to be measured when the on-board measuring device measures a surface shape of the object to be measured.

The measurement program can be created based on a machining program for the object to be measured. The machining program can be designed to always orient a central axis of a machining tool in a direction perpendicular to a face to be machined of the object to be measured.

At least one of the object to be measured and the on-board measuring device may be mounted on the rotation axis of the machine tool.

The on-board measuring device and a tool for machining the object to be measured may be mounted on the same axis.

According to the present invention, it is possible to provide a machine tool system for measuring the shape of an object to be measured by means of on-board measurement which is carried out by simultaneous multi-axis measurement including a linear drive axis and a rotation axis and by bringing the same tip end point of the measuring head of the on-board measuring device in contact with the surface of the object to be measured.

BRIEF DESCRIPTION OF THE DRAWINGS

Above and other objects and features of the present invention will become apparent from the following description of embodiments with reference to the accompanying drawings, wherein:

FIGS. 10A to 10C are drawings for explaining that the on-board measuring device and the machining device are mounted on the same rotation axis and that the on-board measuring device carries out measurement.

DETAILED DESCRIPTION OF THE PREFERRED EMBODIMENTS

Figure 1:
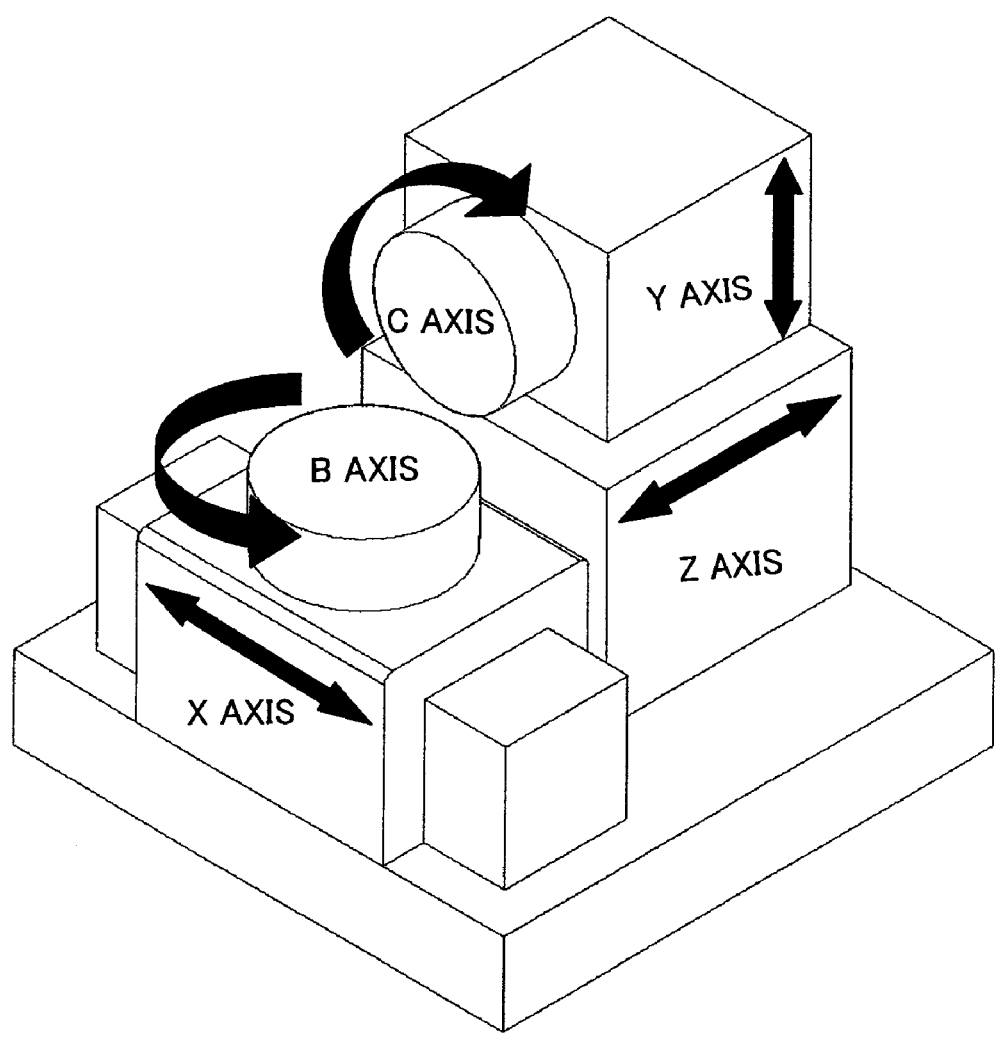
FIG. 1 is a drawing showing an essential portion of a machine tool which is controlled by a numerical controller, which has three linear drive axes (an X axis, a Y axis, and a Z axis) and two rotation axes (a B axis and a C axis), and whose five axes can be controlled simultaneously.

FIG. 1 shows an essential portion of a machine tool which is controlled by a numerical controller, which has three linear drive axes (an X axis, a Y axis, and a Z axis) and two rotation axes (a B axis and a C axis), and whose five axes can be controlled simultaneously. The B axis, which is a rotation axis, is provided on the X axis, which is a linear drive axis, and the C axis, which is a rotation axis, is provided on the Y axis, which is a linear drive axis.

Figure 2:
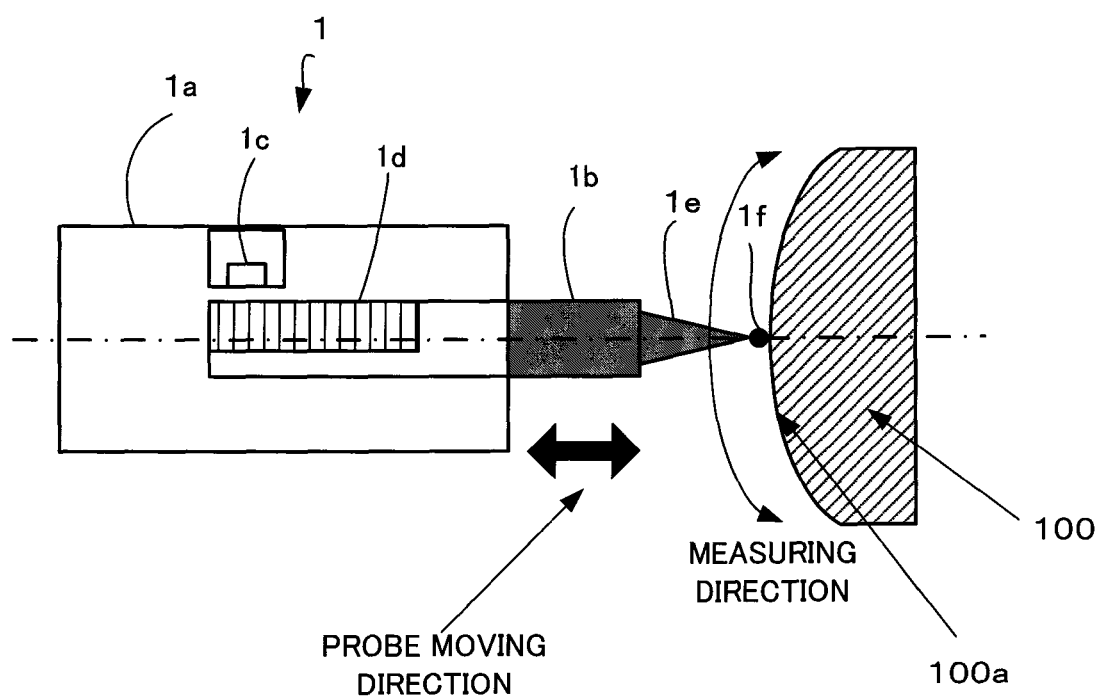
FIG. 2 is a sectional view of an essential portion of an on-board measuring device used in each embodiment of the machine tool system of the invention.

FIG. 2 is a sectional view of an essential portion of an on-board measuring device 1 used in a machine tool system of the invention. The on-board measuring device 1 has a probe 1b mounted in a case 1a and the probe 1b can move in an axial direction of the probe by means of a bearing (not shown) such as an air bearing. A rod 1e of a measuring head is mounted on one end of the probe 1b. The rod 1e of the measuring head is a thin rod-shaped member having one end fixed to the probe 1b and the other end mounted with a spherical measuring head 1f. The spherical measuring head 1f comes in contact with a face 100a to be measured of an object 100 to be measured to perform shape measurement.

The on-board measuring device 1 has a linear scale 1d and a laser head 1c in the case 1a. The linear scale 1d and the laser head 1c form a displacement detecting means. The on-board measuring device 1 is moved along the face 10a to be measured of the object 100 to be measured and displacement of the probe 1b during the movement is detected by the displacement detecting means. The displacement detecting means outputs a displacement detection signal (position information of the probe 1b) indicating displacement of the probe 1b. The displacement detection signal is input and stored as a measurement signal ipf from the on-board measuring device 1 in a personal computer 11 (described later).

Figure 3:
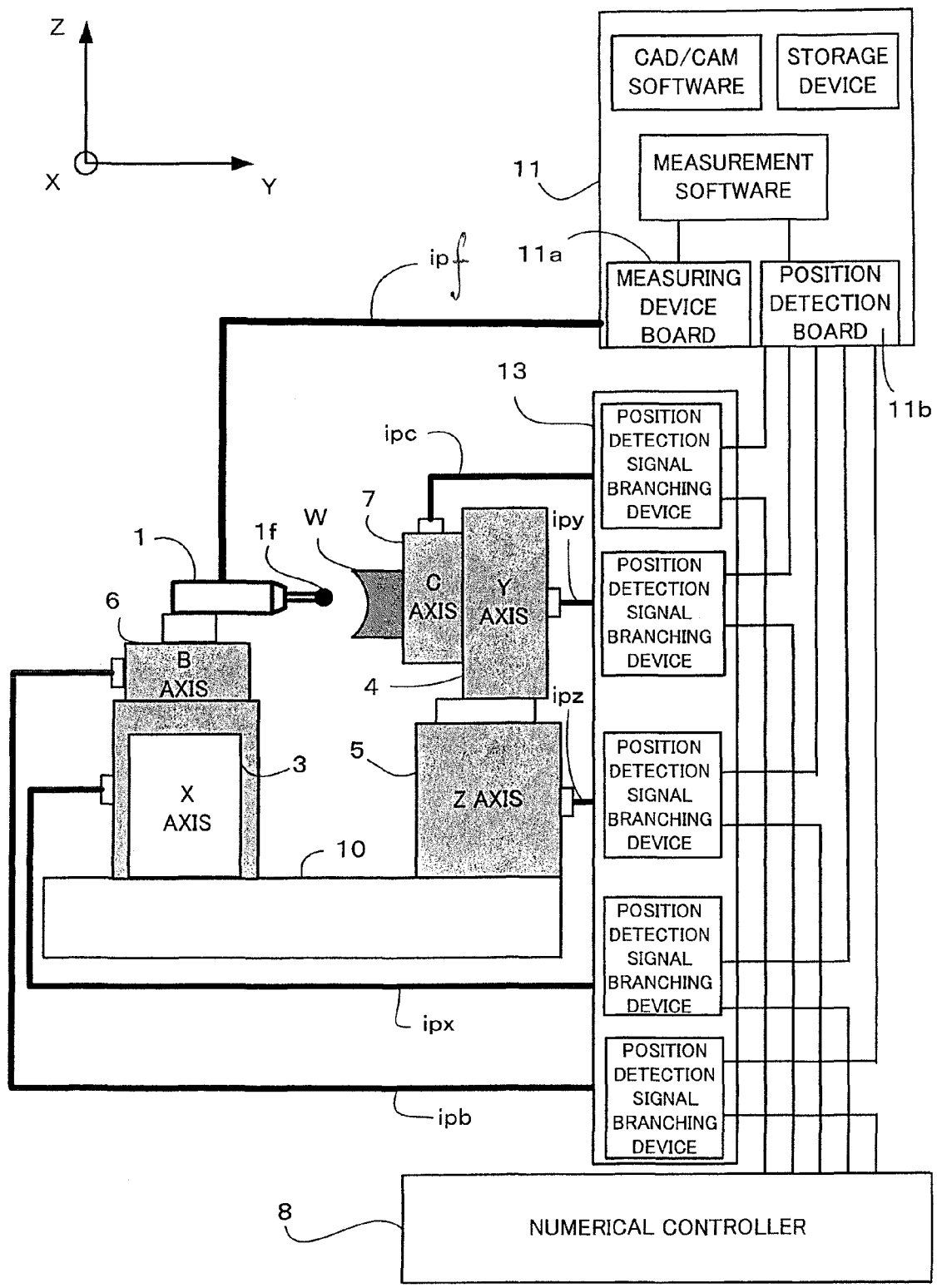
FIG. 3 shows an example of the machine tool system according to the invention and of a type where a measurement signal from an on-board measuring device is input to a personal computer.

FIG. 3 shows an example of the machine tool system of a type where the measurement signal from the on-board measuring device is input to the personal computer. In this example, the on-board measuring device 1 having a different interface from that of the machine tool is mounted on the B axis, which is the rotation axis of the machine tool.

In order to synchronously obtain pieces of position information of the respective axes (the X axis, the Y axis, the Z axis, the B axis, and the C axis) of the machine tool and measurement information indicating displacement of the probe of the on-board measuring device 1, position detection signals ipx, ipy, ipz, ipb, and ipc of the respective axes of the machine tool are branched by a position detection signal branching device 13 to two parts, one parts of which are simultaneously input to the personal computer 11, which is an external storage device and has a position detection signal board 11a and a measuring device board 11b, and the other parts are input to the numerical controller 8. In FIG. 3, a reference numeral 10 designates a base on which the respective axes are mounted.

FIG. 3 shows that measurement software is used to store the input pieces of position information of the respective axes of the machine tool and the measurement information, which is displacement information of the probe and input from the on-board measuring device 1, to thereby carry out measurement. In a storage device of the personal computer 11, a measurement NC program, a machining NC program, and a machining corrective NC program are stored.

As described above, in order to synchronously obtain the signal from the on-board measuring device 1 and the signals from the respective axes of the machine tool, the signals from the position detecting devices respectively mounted on the respective axes of the machine tool need to be branched by using separate signal branching devices 13 and input to the personal computer 11 as well as to the numerical controller 8 as shown in FIG. 3. The number of the position detection signal branching devices 13 needs to be equal to the number of movable axes required for the on-board measurement.

The signals of the respective axes of the machine tool include pitch errors due to mounting errors of the position detecting devices and the like. Normally, the numerical controller corrects the pitch errors to minimize the errors. However, the signals branched out of the position detection signal branching devices 13 are crude signals whose pitch errors have never been corrected and therefore data stored in the personal computer 11 need to be separately subjected to pitch error correction.

Figure 4:
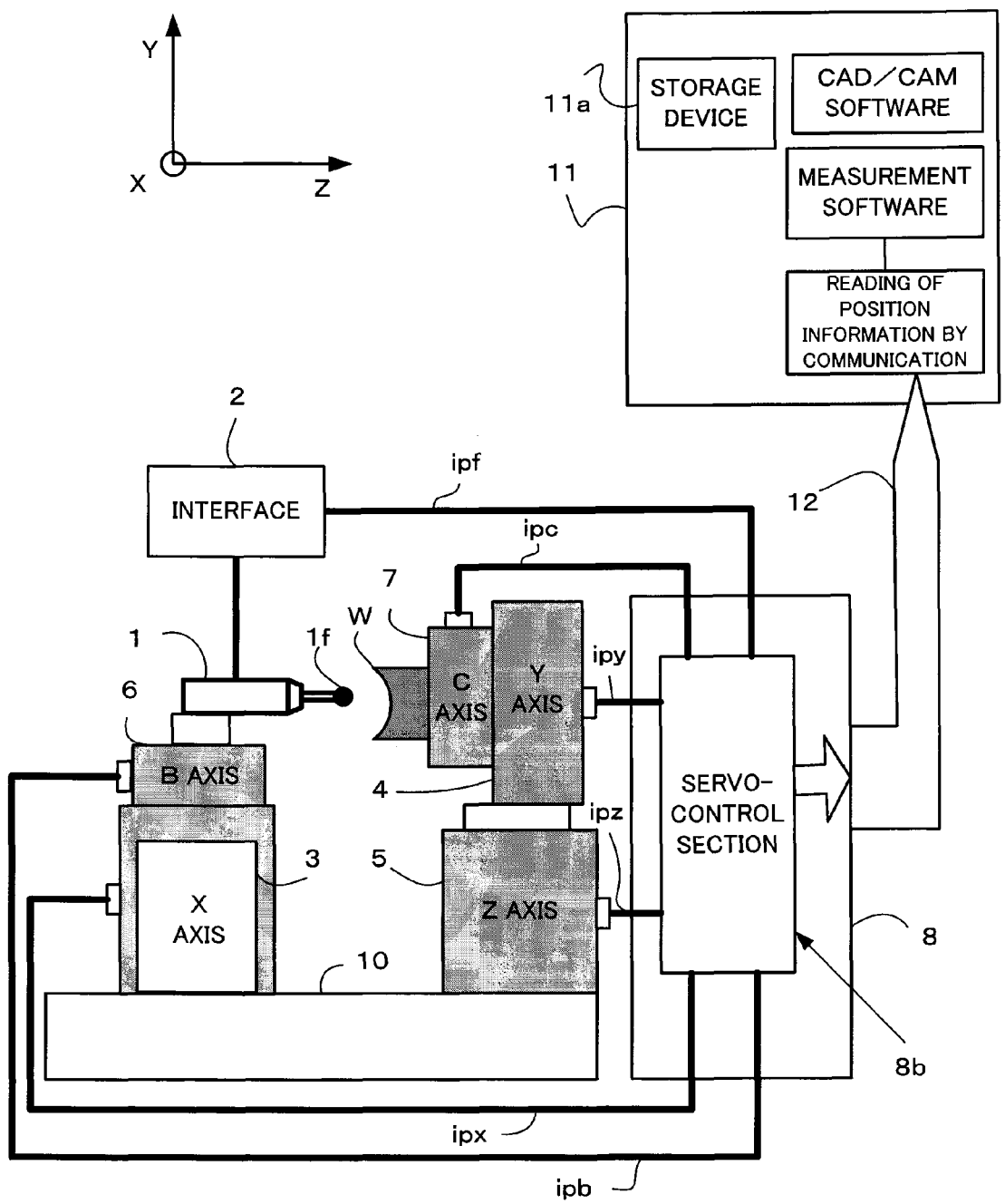
FIG. 4 shows an example of the machine tool system according to the invention and of a type where the measurement signal from the on-board measuring device is input to the personal computer via a numerical controller.

FIG. 4 shows an example of the machine tool system of a type where a measurement signal from a non-board measuring device is input to a personal computer via a numerical controller. In this example, the same type of interface as those mounted on the respective axes of the machine tool is used for the on-board measuring device 1 mounted on the B axis (rotation axis) and, as a result, the position detection signals of the respective axes of the machine tool and the measurement signal of the on-board measuring device 1 are easily synchronously input to a servo-control sections 8b which are feed shaft drive control sections of the numerical controller 8.

The on-board measuring device 1 shown in FIG. 4 is the on-board measuring device 1 shown in FIG. 2. Position detection signals ipx, ipy, ipz, ipb, and ipc respectively output from position detecting devices (not shown) mounted in servomotors for driving the respective axes (the X axis 3, the Y axis 4, the Z axis 5, the B axis 6, and the C axis 7) of the machine tool are fedback to the servo-control sections 8b of the numerical controller 8. Moreover, a position detection signal ipf, which is the measurement signal regarding displacement of the probe 1b, is input from the on-board measuring device 1 for measuring the surface shape of the workpiece W to the servo-control section 8b via the interface 2.

Figure 5:
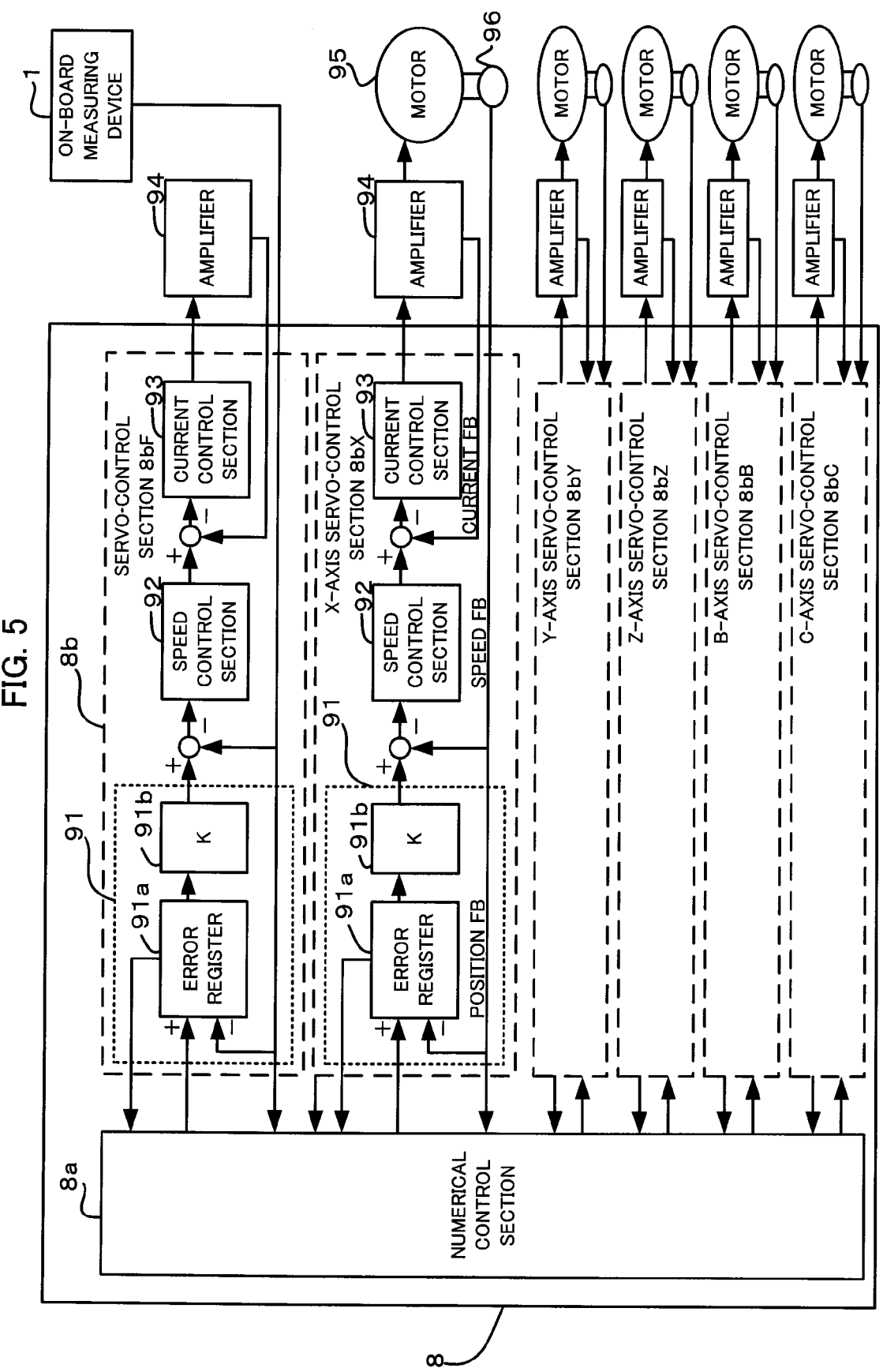
FIG. 5 is a drawing showing that respective axes (the X axis, the Y axis, the Z axis, the B axis, and the C axis) of the machine tool shown in FIG. 4 are feedback-controlled in terms of position, speed, and current by servo-control sections of the numerical controller.

The position detection signals ipx, ipy, ipz, ipb, and ipc output from the position detecting devices of the respective axes of the machine tool are also input to the servo-control sections 8b via interfaces (not shown). These interfaces, which will be described later by using FIG. 5, are formed so that the position detection signals output from the position detecting devices 96 mounted in the servomotors 95 and the measurement signal output from the on-board measuring device 1 are synchronously input to the servo-control sections 8b of the numerical controller 8.

The numerical controller 8 shown in FIG. 4 includes a storage means (not shown) for storing the pieces of position information of the respective axes of the machine tool and the measurement information (position information) from the on-board measuring device 1 and an interface (not shown) for sending the pieces of position information stored in the storage means out to the personal computer 11, which is an external device.

In the example in FIG. 4, as described above, the position detection signals, which are the feedback signals from the respective axes of the machine tool, and the measurement signal from the on-board measuring device are respectively obtained by the servo-control sections 8b of the numerical controller 8 via the interfaces 2 having the same circuit configurations. In this way, it is easy to synchronize input of the measurement signals from the position detecting devices of the respective axes of the machine tool and from the on-board measuring device (i.e., input of the axis position detection signals of the respective axes and the position detection signal from the on-board measuring device) to the numerical controller 8. Then, the read measurement signals are stored as position information in the storage means (not shown) of the numerical controller 8.

The numerical controller 8 communicates on a LAN with the personal computer 11 as the external device via Ethernet (registered trademark) 12 and sends the pieces of position information from the respective axes of the machine tool and the measurement information from the on-board measuring device 1 to a storage device 11a connected to or mounted in the personal computer 11. The personal computer 11 synchronously stores the pieces of position information from the respective axes of the machine tool and the position information from the on-board measuring device 1 in the storage device 11a at each sampling period.

The measurement software is stored in the personal computer 11 to perform necessary arithmetic processing such as shape measurement of the workpiece according to prior art and based on the pieces of position information read in via the numerical controller 8. In this personal computer 11, the measurement NC program, the machining NC program, and the machining corrective NC program are stored as well as the measurement software.

FIG. 5 is a drawing showing that respective axes (the X axis, the Y axis, the Z axis, the B axis, and the C axis) of the machine tool shown in FIG. 4 are feedback-controlled in terms of position, speed, and current by servo-control sections 8bX, 8bY, 8bZ, 8bB, and 8bC of the numerical controller 8. The feedback control is control that is normally carried out by a numerical controller for controlling a machine tool. Here, the X-axis servo-control section 8bX will be described as an example.

The X-axis servo-control section 8bX is formed of a position control section 91 for carrying out position loop control, a speed control section 92 for carrying out speed loop control, and a current control section 93 for carrying out current loop control.

The position control section 91 has an error register 91a and an amplifier 91b for a position loop gain K. The position control section 91 (error register 91a) receives a movement command from the numerical control section 8a and subtracts a position feedback amount (position FB) from the received movement command to obtain a position deviation amount. The position control section 91 multiplies the position deviation amount by a position loop gain K to obtain a speed command and passes the obtained speed command to the speed control section 92. The position deviation amount calculated in the error register 91a is output to the numerical control section 8a as well.

The speed control section 92 carries out the speed loop control based on a speed deviation amount obtained by subtracting a speed feedback amount (speed FB) from the received speed command to obtain a current command and passes the obtained current command to the current control section 93.

From the received current command, the current control section 93 subtracts a current feedback (current FB) from a current sensor (not shown), which is mounted in an amplifier 94 for driving the servomotor 95 and which detects an current passing through the servomotor 95, to obtain a current deviation amount and carries out the current loop control based on the obtained current deviation amount.

The servomotor 95 is a driving means for driving the X axis and mounted with a position/speed detector 96 for detecting a position and speed of the X axis. The position feedback amount (position FB) from the position/speed detector 96 is fed back to the position control section 91 and the speed feedback amount (speed FB) is fed back to the speed control section 92.

Since servo-control sections, 8bY, 8bZ, 8bB, and 8bC of the Y axis, the Z axis, the B axis, and the C axis shown in FIG. 5 have the same structures and functions as the above-described X-axis servo-control section 8bX, they will not be described. In FIGS. 4 and 5, the X axis, the Y axis, and the Z axis are the linear drive axes and the B axis and the C axis are the rotation axes.

The numerical controller shown in FIG. 5 is provided, besides the servo-control sections 8bX, 8bY, 8bZ, 8bB, and 8bC of the X axis, the Y axis, the Z axis, the B axis, and the C axis, with the servo-control section 8bF to which the motors for driving the respective axes of the machine tool and their position/speed detecting means are not connected. The letter "F" of the reference numeral 8bF designating the servo-control section stands for "free", which means that the section is free of control of any one of the movable axes of the machine tool.

The numerical controller 8 recognizes addition of the servo-control section 8bF to the servo-control sections 8bX, 8bY, 8bZ, 8bB, and 8bC merely as addition of another control axis. The additional servo-control section 8bF is provided with an amplifier 94 similarly to the servo-control sections 8bX, 8bY, 8bZ, 8bB, and 8bC for controlling the respective axes of the machine tool. Because no servomotor is connected to the servo-control section 8bF, the numerical controller 8 brings the servo-control section 8bF into a servo-off state. Moreover, a parameter and control software are changed so that the position detection signals are counted normally by using a follow-up function.

Instead of the servomotor, the on-board measuring device 1 is connected to the servo-control section 8bF. In the example shown in FIG. 5, the measurement signal ipf from the on-board measuring device 1, instead of the position detection signal from the position/speed detector 96 mounted in the servomotor 95, is input to the servo-control section 8bF via a transmitting means (not shown) for sending/receiving data for control which is provided to the amplifier 94 connected to the servo-control section 8bF. The transmitting means for sending/receiving the data is provided to the amplifier 94 as described above and is not different from prior art.

Figure 6:
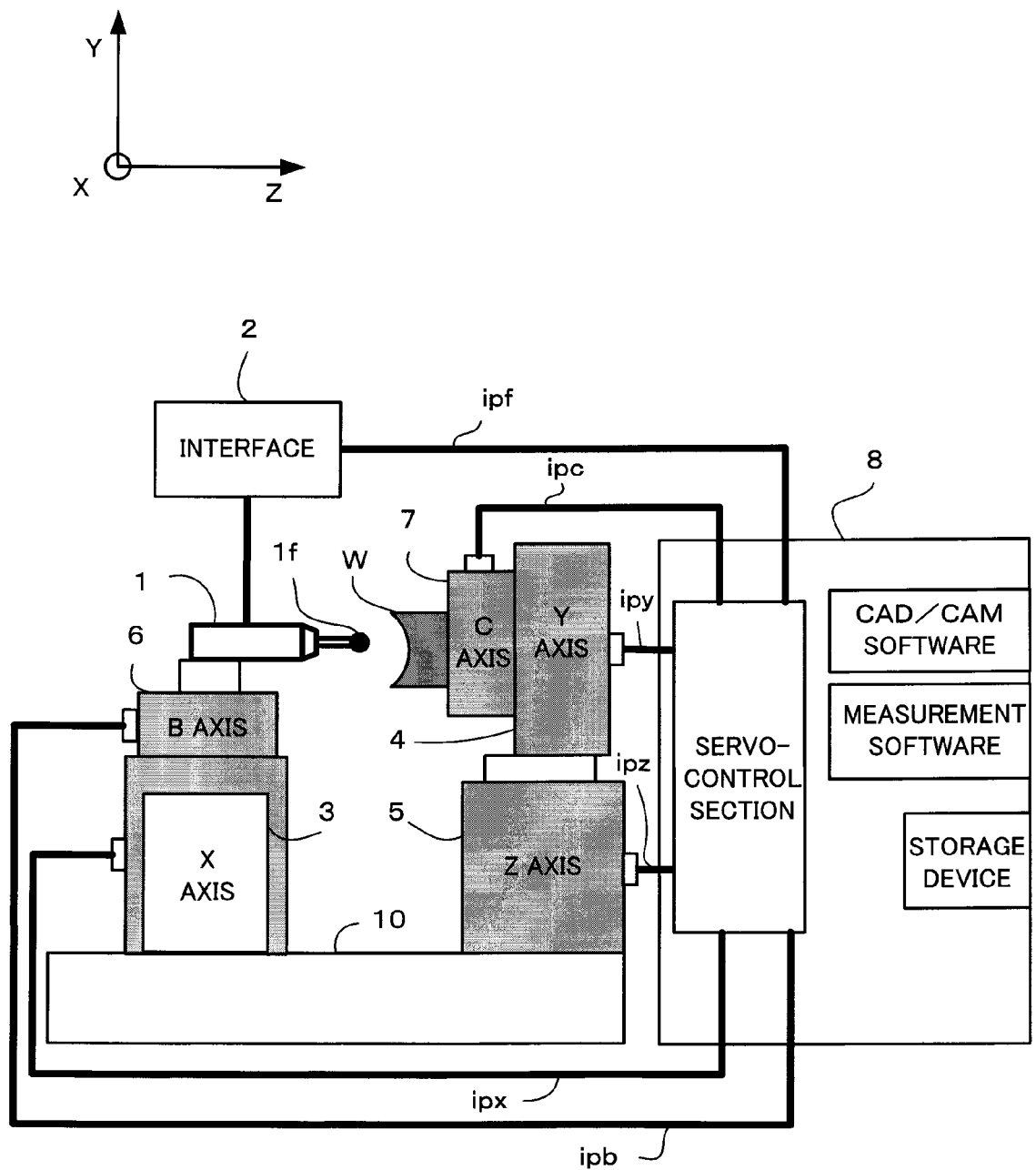
FIG. 6 shows an example of the machine tool system according to the invention and of a type where the measurement signal from the on-board measuring device is input to the numerical controller but is not transmitted to the personal computer.

FIG. 6 shows an example of machine tool system of a type where measurement signal from an on-board measuring device is input to a numerical controller but is not transmitted to a personal computer. In this example, the measurement software, which is provided in the personal computer 11 in the above-described example in FIG. 4, is now provided in the numerical controller 8 and the numerical controller 8 itself stores the pieces of position information of the respective axes of the machine tool and the position information of the probe of the on-board measuring device.

In the example shown in FIG. 4, the pieces of position information of the respective axes of the machine tool are transmitted to the personal computer 11 via the numerical controller 8. In the example shown in FIG. 6, on the other hand, the pieces of position information and the measurement signals are input to and stored in the numerical controller 8. For this purpose, a sufficiently large capacity of an internal storage device of the numerical controller 8 is secured. If CAD/CAM software is stored as well in the numerical controller 8, all of machining, shape measurement, shape analysis, which will be described later, can be performed in the numerical controller 8.

Figure 7:
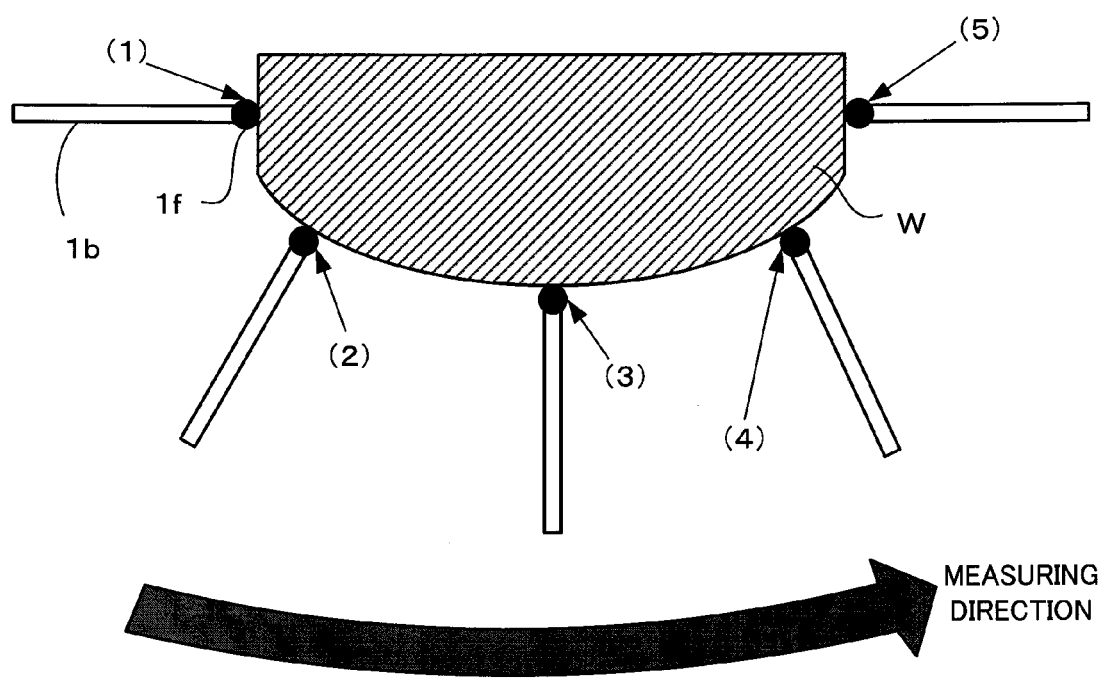
FIG. 7 is a drawing for explaining that a probe is oriented in a direction perpendicular to a surface of an object to be measured to perform measurement.

FIG. 7 is a drawing for explaining that a probe is oriented in a direction perpendicular to a surface of an object to be measured. The on-board measuring device is mounted on the rotation axis and is caused to scan under simultaneous control of the respective axes so that the spherical measuring head (ruby sphere) comes in contact with and follows the surface of the workpiece having the curved surface in order to measure the surface of the workpiece. By detecting displacement of the probe 1*b* (movable member) of the on-board measuring device, the shape of the surface of the workpiece W is measured.

FIGS. 8A to 8E explain how the spherical measuring head 1*f* (ruby sphere) are in contact with the surface of a workpiece W (object to be measured) in measurement at points (1) to (5) in FIG. 7. In this measurement, as shown in FIG. 7, the respective axes of the machine tool are controlled simultaneously so that the central axis of the probe 1*b* is always oriented in a direction perpendicular to a face of a measurement point on the workpiece W.

Figure 8A:
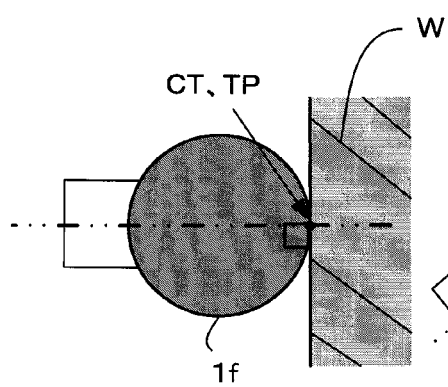
FIGS. 8A to 8F explain how a spherical measuring head (ruby sphere) is in contact with the surface of a workpiece W (object to be measured) in measurement at points (1) to (5) in FIG. 7.
Figure 8B:
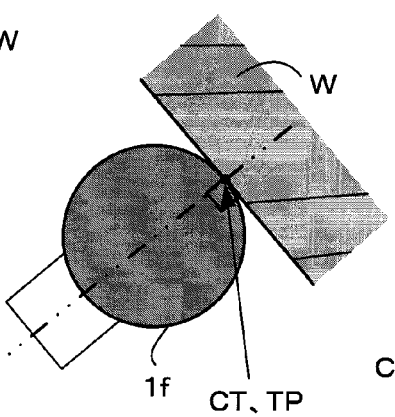
Figure 8C:
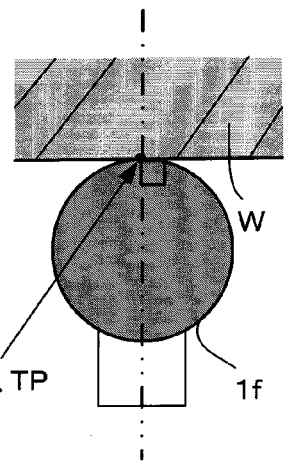
Figure 8D:
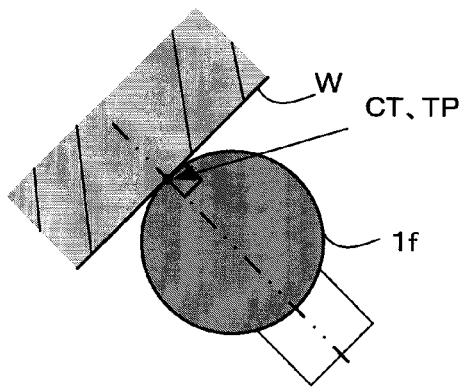
Figure 8E:
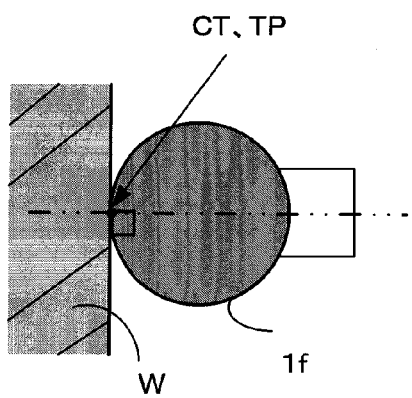
Figure 8F:
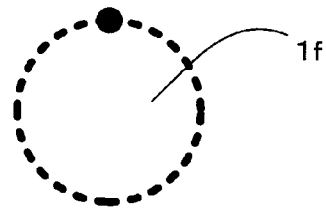

In the measurement shown in FIG. 7, a surface part (touch point TP) of the spherical measuring head which is in contact with the curved surface of the object to be measured (workpiece W) in measuring of the curved surface always coincides with a point CT where the central axis of the probe intersects with the surface of the spherical measuring head 1*f* (TP=CT) as shown in FIGS. 8A to 8E. A black circle on a circle in a dotted line in FIG. 8F shows a position (i.e., the point CT only) where the spherical measuring head 1*f* is in contact with the surface of the workpiece W while the measuring device moves from the point (1) to the point (5) in FIG. 7.

In this way, it is possible to carry out measurement at a 90° or greater angle, which has been impossible in prior art. Moreover, since measurement is always carried out at one point (the point CT) on the spherical measuring head 1*f*, calibration of the spherical measuring head needs to be carried out at the one point CT only and it is possible to minimize influence of the shape error of the spherical measuring head 1*f*.

Next, by using FIGS. 9A to 9C and FIGS. 10A to 10C, machining and measurement when the on-board measuring device and the machining tool are mounted on the same rotation axis will be described.

Figure 9C:
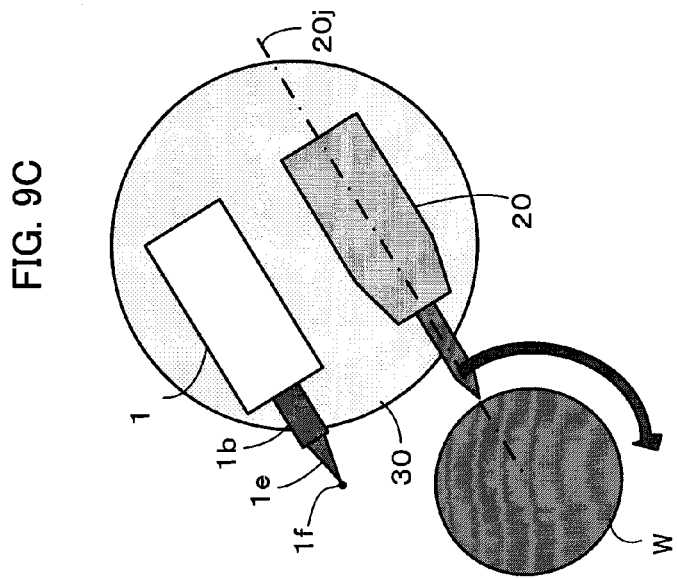
FIGS. 9A to 9C are drawings for explaining that the on-board measuring device and a machining device are mounted on the same rotation axis and that a machining tool of the machining device carries out machining.
Figure 9B:
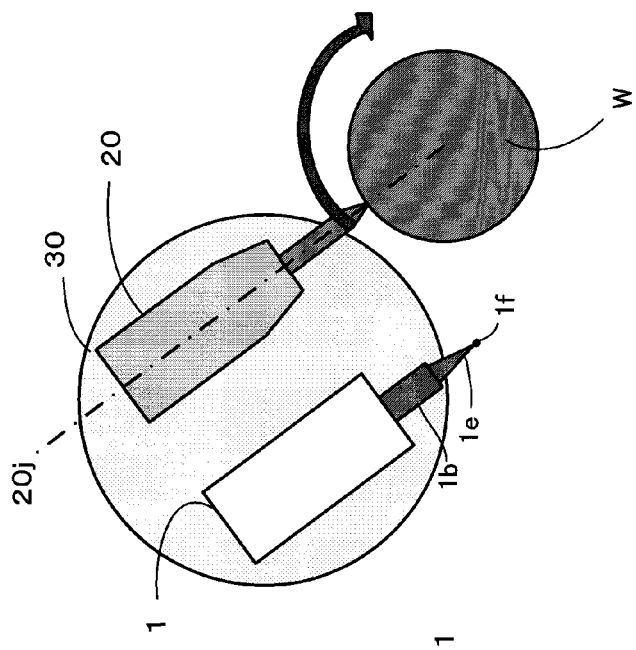
Figure 9A:
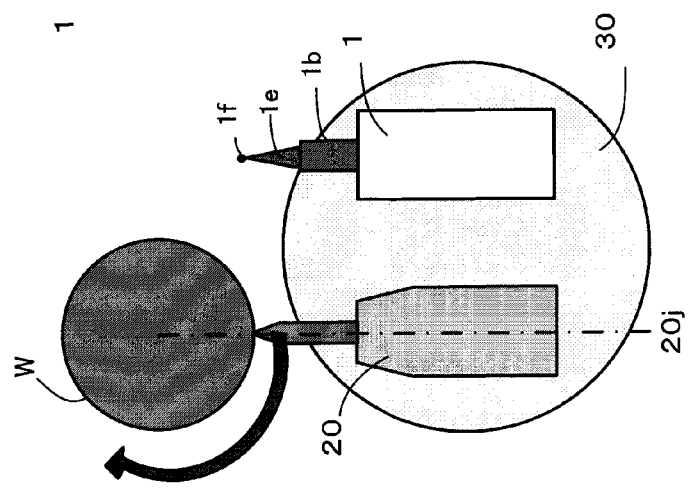

FIGS. 9A to 9C are drawings for explaining that the on-board measuring device 1 and a machining device 20 are mounted on the same rotation axis 30 and that the machining tool of the machining device 20 carries out machining. Machining is carried out while simultaneously controlling the respective axes of the machine tool so that a tool axis 20*j* of the machining tool is always oriented in a direction perpendicular to the face of the workpiece W.

Causing the machine tool to perform machining while instructing the machine tool to always orient the tool axis 20*j* of the machining tool in the direction perpendicular to the face to be machined of the workpiece W is carried out conventionally and a machining program for performing the machining is also known conventionally. Therefore, for the surface machining of the workpiece W shown in FIGS. 3, 4, and 6, it is possible to use the machining program for machining while always orienting the tool axis 20*j* of the machining device 20 in the direction perpendicular to the surface of the workpiece W.

By mounting the on-board measuring device 1 on the machine tool and using the machining NC program to treat the on-board measuring device 1 as one of tools to simultaneously control the respective axes of the machine tool, it is possible to control the orientation of the central axis of the probe 1*b* and the position of the spherical measuring head 1*f* provided to the on-board measuring device 1 to thereby cause the spherical measuring head 1*f* to come in contact with and follow the surface of the workpiece W.

FIGS. 10A to 10C are drawings for explaining that the on-board measuring device 1 and the machining device 20 are mounted on the same rotation axis 40 and that the on-board measuring device 1 carries out measurement. After the machining shown in FIGS. 9A to 9C, the on-board measuring device 1 carries out the measurement while a measurement program created based on the machining program for the machining simultaneously controls the respective axes of the machine tool (see FIG. 1) to always orient the central axis 1*j* of the probe 1*b* in the direction perpendicular to the face of the workpiece W. When the on-board measuring device carries out on-board measurement by using the machining program, an offset of the point of intersection of the central axis 1*j* of the probe 1*b* and the spherical measuring head 1*f* from a tool cutting edge is incorporated in the machining program to create the measurement program. The machining program can be used to create the measurement program, which saves the trouble of creating the measurement program from scratch.

Figure 11:
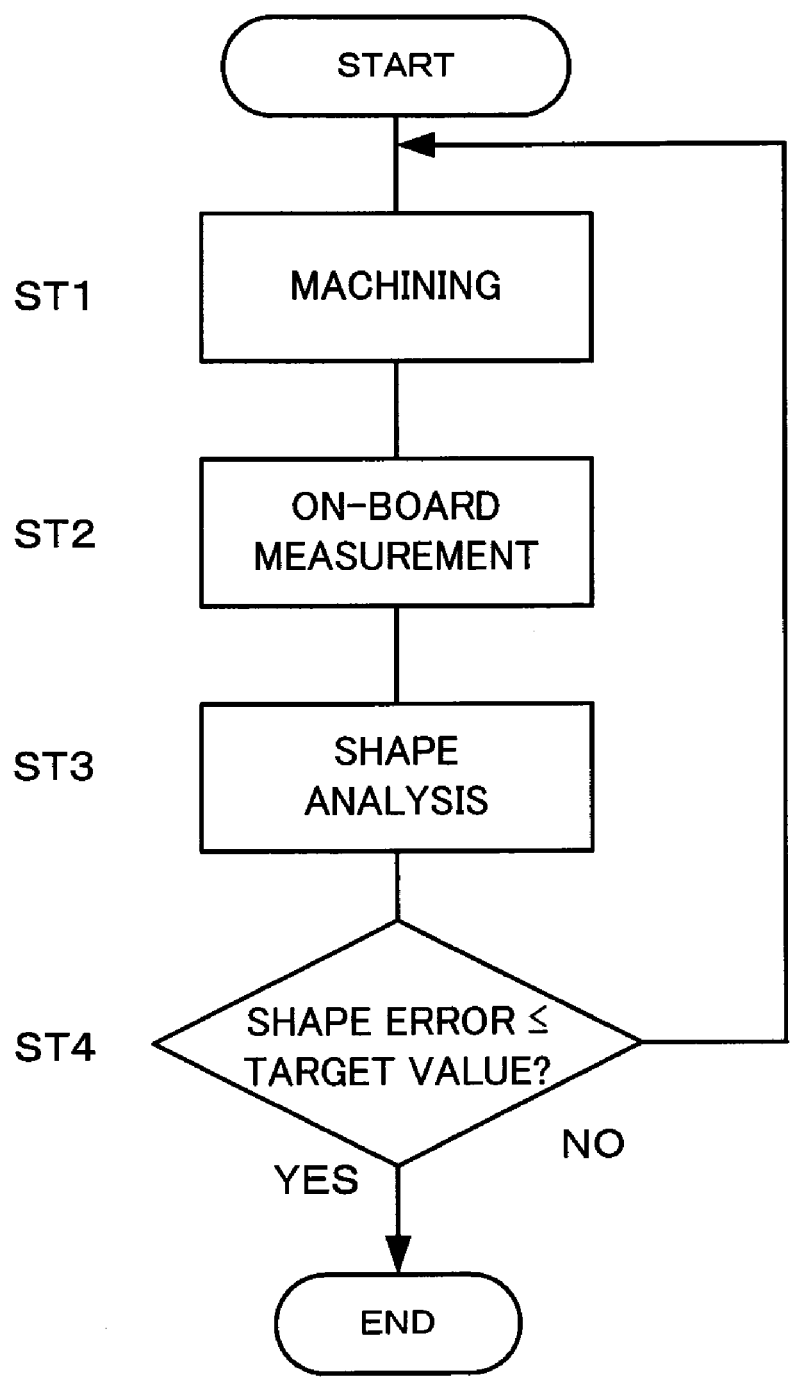
FIG. 11 is a flowchart showing an algorithm for carrying out the machining shown in FIGS. 9A to 9C and the measurement shown in FIGS. 10A to 10C.
Figure 12:
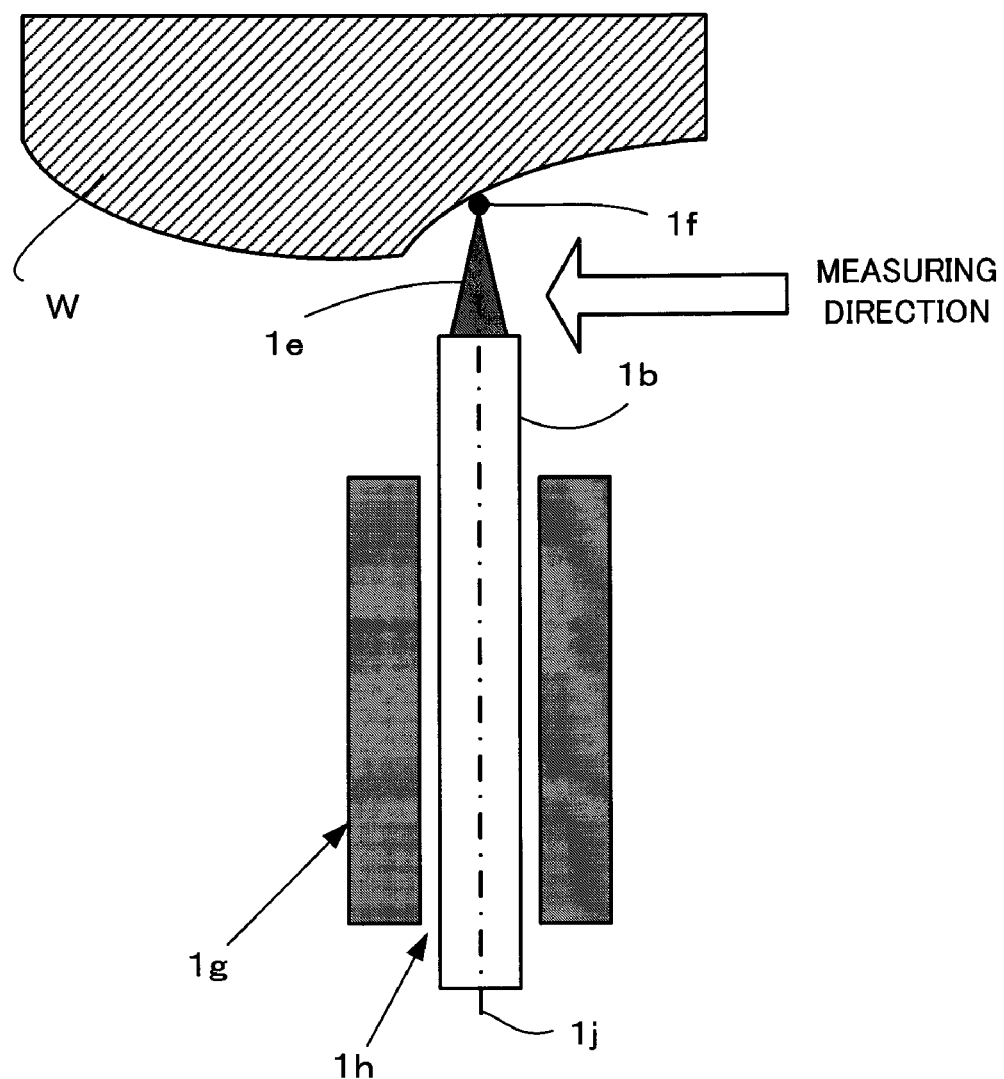
FIG. 12 is a schematic sectional view of a general on-board measuring device and shows that there is a minute clearance (bearing clearance) between the probe and a bearing.
Figure 13:
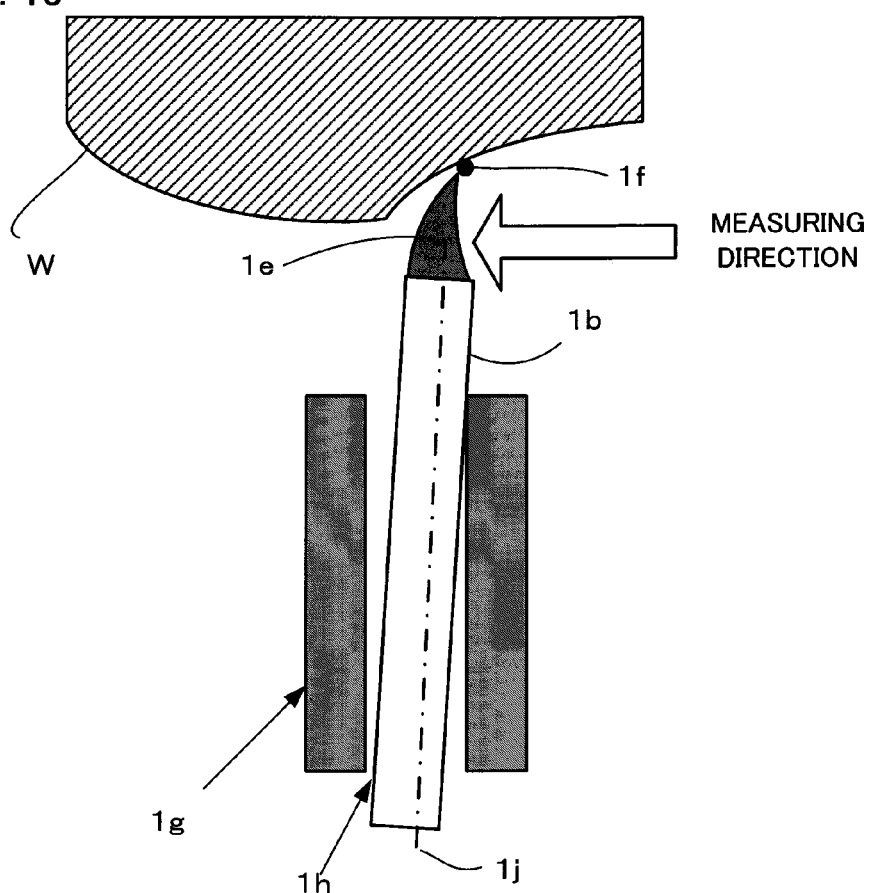
FIG. 13 is a drawing for explaining states of the probe, a rod of a measuring head, and a sphere of the measuring head when the probe shown in FIG. 12 moves in a direction perpendicular to a central axis of the probe.
Figure 14:
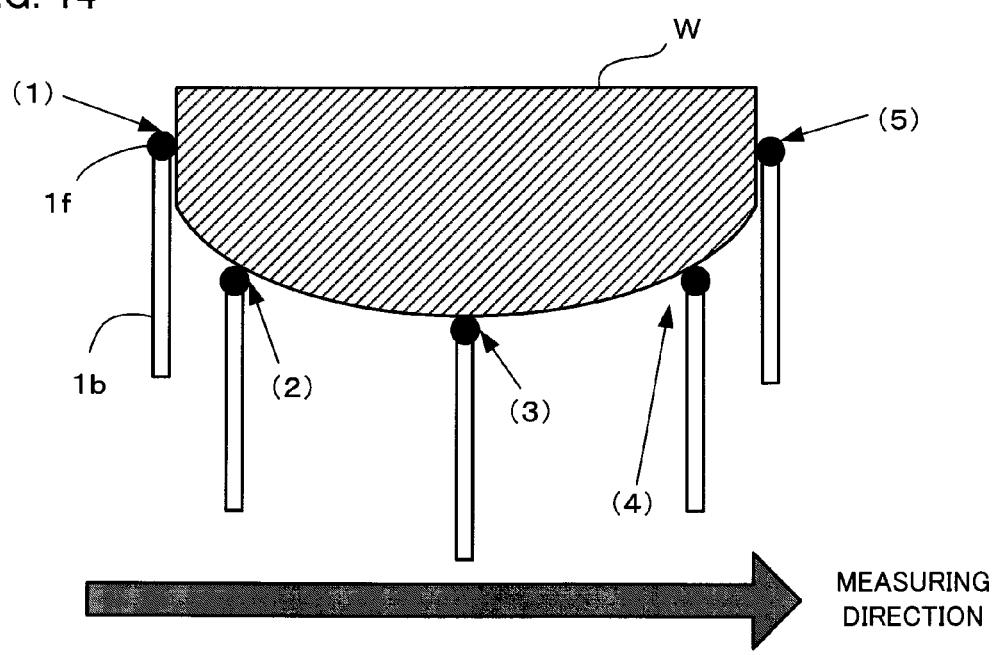
FIG. 14 is a drawing for explaining an example of a prior-art measuring method for measuring a surface of a workpiece having a curved surface with a measuring device mounted on a machine by a plurality of linear drive axes without using a rotation axis.
Figure 15A:
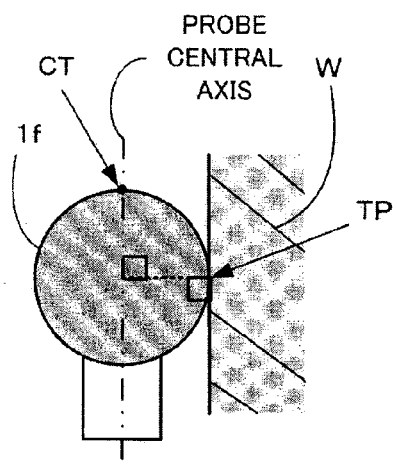
FIGS. 15A to 15F are drawings for explaining how a spherical measuring head (ruby sphere) is in contact with a surface of a workpiece in measurement at points (1) to (5) in FIG. 14.
Figure 15B:
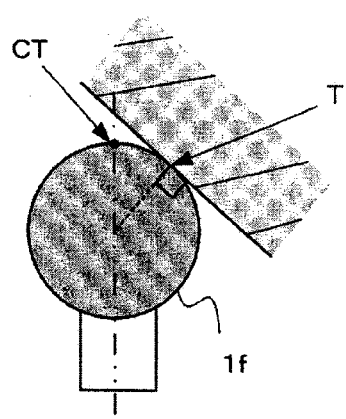
Figure 15C:
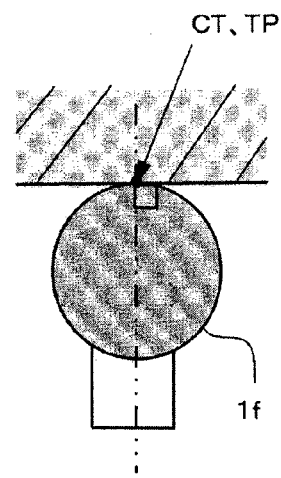
Figure 15D:
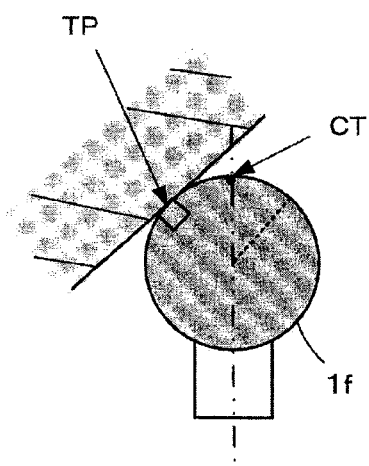
Figure 15E:
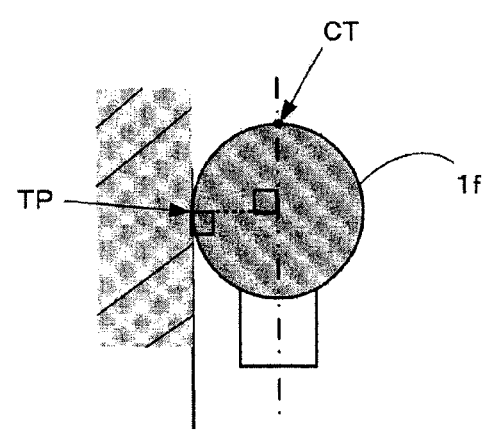
Figure 15F:
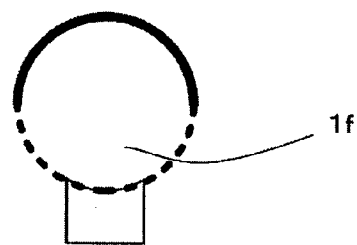

By performing the machining shown in FIGS. 9A to 9C and the measurement shown in FIGS. 10A to 10C according to an algorithm shown in FIG. 11, it is possible to achieve high-precision machining. A flowchart of the algorithm shown in FIG. 11 will be described following the respective steps.

The machining device 20 is used to machine the workpiece W (step ST1), the on-board measuring device 1 is used to measure the surface shape of the workpiece (step ST2), the measurement data obtained in step ST2 is analyzed to perform shape analysis of the workpiece (step ST3), and whether a shape error in the machining in step ST1 is smaller than the target value or not is determined based on a result of the shape analysis (step ST4). If the error is smaller than the target value, the processing returns to step ST1 to continue the machining of the workpiece. If the error is not smaller than the target value, on the other hand, the processing for machining and measurement ends.

What is claimed is:

1. A machine tool system in which machining is carried out according to a machining program configured to orient a central axis of a machining tool in a direction perpendicular to a surface to be machined of an object to be measured, a measuring program is created based on the machining program for the object to be measured, and a shape of the surface of the object to be measured is measured by using an on-board measuring device including a probe having a measuring head, the machine tool system comprising:

a machine tool having one or more linear axes and one or more rotation axes;

a numerical controller for controlling driving of the respective axes of the machine tool;

a position detecting device for detecting positions of the respective axes of the machine tool;

the on-board measuring device for measuring the shape of the surface of the object to be measured;

interfaces, which are provided for the on-board measuring device and the respective axes of the machine tool and have the same circuit configurations, for synchronously inputting position detection signals from the position detecting device and measuring signals detected by the on-board measuring device to a storage device provided in the numerical controller as position information; and a measuring arithmetic device for measuring and calculating the shape of the object to be measured based on the position information synchronously input and stored in the storage device of the numerical controller;

wherein at least one of the on-board measuring device and the object to be measured is mounted on one of the one or more rotation axes of the machine tool;

the machining tool and the on-board measuring device are mounted on the same axis with an offset provided therebetween; and the numerical controller is arranged to control the driving of the respective axes of the machine tool so that the measuring head of the probe comes in contact with and follows the surface of the object to be measured according to the measurement program, which is configured to orient a central axis of the probe in a direction perpendicular to the surface of the object to be measured when the on-board measuring device measures the shape of the surface of the object to be measured, by treating the measuring head as one of tools and incorporating the distance from a cutting edge of the tool to a point of intersection of the central axis of the probe and the measuring head in the machining program as the offset to create the measuring program.

* * * * *